(12) United States Patent
Buck, Jr. et al.

(10) Patent No.: US 11,164,444 B2
(45) Date of Patent: *Nov. 2, 2021

(54) SYSTEMS AND METHODS FOR MULTI-DEVICE RESTRICTION ZONE MAINTENANCE

(71) Applicant: BI Incorporated, Boulder, CO (US)

(72) Inventors: James J. Buck, Jr., Longmont, CO (US); Joseph P. Newell, Louisville, CO (US); Dustin Pettit, Boulder, CO (US); Mike Cooke, Boulder, CO (US)

(73) Assignee: BI Incorporated, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,464

(22) Filed: Apr. 8, 2020

(65) Prior Publication Data

US 2020/0234561 A1     Jul. 23, 2020

Related U.S. Application Data

(63) Continuation of application No. 16/221,495, filed on Dec. 15, 2018, now Pat. No. 10,650,663.

(Continued)

(51) Int. Cl.
| | |
|---|---|
| *G08B 25/01* | (2006.01) |
| *G08B 21/22* | (2006.01) |
| *H04W 4/029* | (2018.01) |
| *H04L 29/08* | (2006.01) |
| *G06Q 50/26* | (2012.01) |
| *G08B 21/24* | (2006.01) |
| *G08B 25/10* | (2006.01) |
| *G01C 21/34* | (2006.01) |
| *G01S 5/00* | (2006.01) |
| *G06F 1/3212* | (2019.01) |

(Continued)

(52) U.S. Cl.
CPC ....... *G08B 25/016* (2013.01); *G01C 21/3461* (2013.01); *G01S 5/0027* (2013.01); *G06F 1/3212* (2013.01); *G06F 1/3296* (2013.01); *G06Q 50/26* (2013.01); *G08B 21/0258* (2013.01); *G08B 21/0269* (2013.01); *G08B 21/0288* (2013.01); *G08B 21/182* (2013.01); *G08B 21/22* (2013.01); *G08B 21/24* (2013.01); *G08B 25/10* (2013.01); *H04L 67/22* (2013.01); *H04L 67/36* (2013.01); *H04W 4/021* (2013.01); *H04W 4/029* (2018.02); *H04W 52/028* (2013.01); *H04W 52/0277* (2013.01); *G01S 2205/002* (2013.01); *G01S 2205/008* (2013.01)

(58) Field of Classification Search
None
See application file for complete search history.

(56) References Cited

U.S. PATENT DOCUMENTS

| | | |
|---|---|---|
| 4,742,427 A | 2/1988 | Carroll |
| 5,731,757 A | 3/1998 | Layson |

(Continued)

FOREIGN PATENT DOCUMENTS

| | | |
|---|---|---|
| WO | WO/1998/08204 | 2/1998 |
| WO | WO/2000/077688 | 12/2000 |

*Primary Examiner* — Thomas S McCormack
(74) *Attorney, Agent, or Firm* — HDC IP Law, LLP

(57) ABSTRACT

Various embodiments provide systems and method for maintaining an exclusion zone data set in relation to monitoring individuals where the maintenance involves both a user attached monitor device and a user detached monitor.

20 Claims, 6 Drawing Sheets

Related U.S. Application Data

(60) Provisional application No. 62/612,650, filed on Jan. 1, 2018.

(51) Int. Cl.

| | | |
|---|---|---|
| *G06F 1/3296* | (2019.01) | |
| *G08B 21/18* | (2006.01) | |
| *H04W 52/02* | (2009.01) | |
| *G08B 21/02* | (2006.01) | |
| *H04W 4/021* | (2018.01) | |

(56) References Cited

U.S. PATENT DOCUMENTS

| | | |
|---|---|---|
| 6,130,620 A | 10/2000 | Pinnow |
| 6,169,484 B1 | 1/2001 | Schuman |
| 6,323,773 B1 | 11/2001 | Runyon |
| 6,393,362 B1 | 5/2002 | Burns |
| 7,015,817 B2 | 3/2006 | Copley |
| 7,619,533 B2 | 11/2009 | Crucilla |
| 7,886,648 B2 | 2/2011 | Williams |
| 7,905,832 B1 | 3/2011 | Lau |
| 7,930,927 B2 | 4/2011 | Cooper |
| 8,352,111 B2 | 1/2013 | Mudalige |
| 8,493,219 B2 | 7/2013 | Buck |
| 8,576,065 B2 | 11/2013 | Buck |
| 8,629,776 B2 | 1/2014 | Buck |
| 8,952,805 B2 | 2/2015 | Baines et al. |
| 9,240,118 B2 | 1/2016 | Melton |
| 9,355,548 B2 | 5/2016 | Buck |
| 9,423,487 B2 | 8/2016 | Buck |
| 9,629,420 B2 | 4/2017 | Cooper |
| 9,668,095 B1 | 5/2017 | Newell |
| 10,068,462 B2 | 3/2018 | Buck |
| 9,989,649 B2 | 6/2018 | Buck |
| 2003/0222781 A1 | 12/2003 | Defant et al. |
| 2005/0040944 A1 | 2/2005 | Contestabile |
| 2007/0014264 A1 | 1/2007 | Davis |
| 2007/0285258 A1 | 12/2007 | Hartman |
| 2008/0012760 A1* | 1/2008 | Derrick ............ G08B 21/0283 342/357.74 |
| 2008/0018459 A1 | 1/2008 | Derrick |
| 2011/0154887 A1 | 6/2011 | Cooper |
| 2011/0195722 A1 | 8/2011 | Walter et al. |
| 2011/0199205 A1 | 8/2011 | Kreml |
| 2011/0237726 A1 | 9/2011 | Dhuna |
| 2013/0328678 A1* | 12/2013 | Shechter ............ G08B 21/22 340/539.13 |
| 2014/0039804 A1 | 2/2014 | Park |
| 2014/0179342 A1 | 6/2014 | Hamerly |
| 2015/0011199 A1* | 1/2015 | Lee .................. H04M 1/7253 455/418 |
| 2015/0123766 A1 | 5/2015 | St. John |
| 2015/0356261 A1 | 12/2015 | Brust |
| 2016/0154643 A1 | 6/2016 | Zhang |
| 2016/0267770 A1 | 9/2016 | Kenya |
| 2016/0301581 A1 | 10/2016 | Carter |
| 2017/0134249 A1 | 5/2017 | Laing |
| 2017/0224517 A1 | 8/2017 | Doyle et al. |
| 2017/0303090 A1 | 10/2017 | Stitt |
| 2017/0307388 A1 | 10/2017 | McConathy |
| 2019/0043285 A1 | 2/2019 | Hodge |

\* cited by examiner

SYSTEMS AND METHODS FOR MULTI-DEVICE RESTRICTION ZONE MAINTENANCE

CROSS REFERENCE TO RELATED APPLICATION

The present application is a continuation of U.S. patent application Ser. No. 16/221,495 entitled "Systems and Methods for Monitoring Individuals", and filed Dec. 15, 2018 by Buck et al.; which in turn claims priority to (i.e., is a non-provisional of) U.S. Pat. App. No. 62/612,650 entitled "Systems and Methods for Monitoring Individuals", and filed Jan. 1, 2018 by Buck et al. The entirety of both of the aforementioned applications is incorporated herein by reference for all purposes.

BACKGROUND OF THE INVENTION

Various embodiments provide systems and method for maintaining an exclusion zone data set in relation to monitoring individuals where the maintenance involves both a user attached monitor device and a user detached monitor.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward.

Thus, there exists a need in the art for more advanced approaches, devices and systems for monitoring.

BRIEF SUMMARY OF THE INVENTION

Various embodiments provide systems and method for maintaining an exclusion zone data set in relation to monitoring individuals where the maintenance involves both a user attached monitor device and a user detached monitor.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
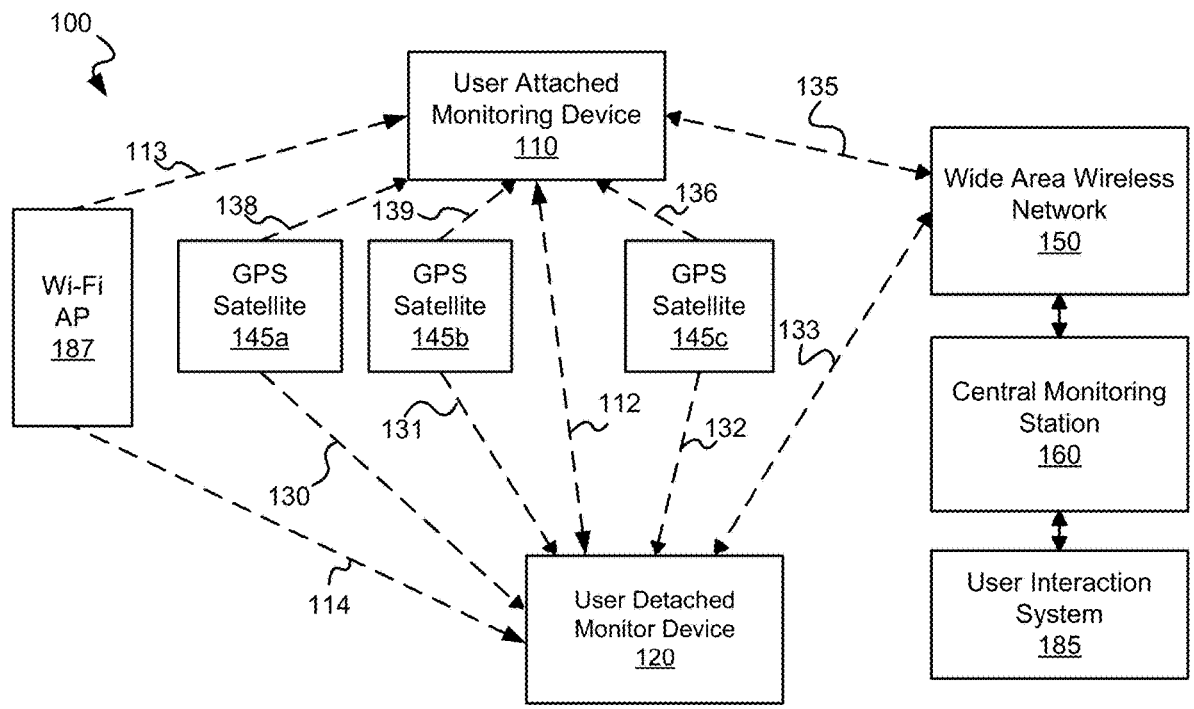
FIG. 1a is a block diagram illustrating a hybrid monitoring system including both a user attached monitor device and a user detached monitor device in accordance with various embodiments.

Various embodiments provide systems and method for maintaining an exclusion zone data set in relation to monitoring individuals where the maintenance involves both a user attached monitor device and a user detached monitor.

It has been found that returning offenders to society after being locked up in a secure facility with little if any control of their day to day activities is often unsuccessful. It is often helpful to have, for example, a parole officer monitor their movements and activities for a period of time as they reenter society. In some cases, the parole officer is aided by a tracking device attached to the individual being monitored. However, this is costly as a parole officer must be significantly involved in monitoring and responding to situations. Some embodiments disclosed herein reduce the interaction between the tracking device and the parole officer.

Further, it has been found that once a monitoring term has been completed and a monitored individual has been fully released into society without oversight, the chances that the individual will re-engage in problematic behavior is high. Various embodiments disclosed herein provides tools and devices that continue to support the individual as they transition away from the active oversight by, for example, a parole officer.

Various embodiments provide monitoring systems that include a user attached monitor device and a user detached monitor device. The user attached monitor device includes: an attachment element configured to attach to a limb of an individual being monitored; a location determination circuit operable to generate location data indicating a location of the user attached monitor device; and an exclusion zone violation determination circuit operable to determine whether the individual being monitored is within an exclusion zone. The user detached monitor device includes a computer readable medium including instructions executable by a processor. The instructions are executable by the processor to: determine a location of the user detached monitor device; determine whether the individual being monitored is within the exclusion zone; and transfer control of determining whether the individual is within the exclusion zone from the user attached monitor device to the user detached monitor device.

In some instances of the aforementioned embodiments, the instructions executable by the processor to determine the location of the user detached monitor device include instructions executable by the processor to receive the location data indicating the location of the user attached monitor device from the user attached monitor device. In some such instances, the location data received by the user detached monitor device from the user attached monitor device is received via a location communication link. The local communication link may be, but is not limited to, a BlueTooth™ communication link or a Wi-Fi communication link.

In various instances of the aforementioned embodiments, the instructions executable by the processor to determine whether the individual being monitored is within the exclusion zone include: instructions executable by the processor to receive user zone restriction data from a central monitor; and instructions executable by the processor to compare the location data indicating the location of the user attached monitor device against the user zone restriction data to determine whether the individual being monitored is within the exclusion zone. In some such instances, the user zone restriction data is received by the user detached monitor device from the central monitor via a communication link. The communication link may be, but is not limited to, a cellular telephone network, the internet accessed via a Wi-Fi access point, or a combination thereof.

In one or more instances of the aforementioned embodiments, the instructions executable by the processor to transfer control of determining whether the individual is within the exclusion zone from the user attached monitor device to the user detached monitor device include instructions executable by the processor to report an occurrence of the user within the exclusion zone to the central monitor. In some such instances, the instructions executable by the processor to transfer control of determining whether the individual is within the exclusion zone from the user attached monitor device to the user detached monitor device further include instructions executable by the processor to send a message to the user attached monitor device requesting that the user attached monitor device turn off communications to the central monitor. In various such instances, the instructions executable by the processor to transfer control of determining whether the individual is within the exclusion zone from the user attached monitor device to the user detached monitor device further include instructions executable by the processor to send a message to the user attached monitor device requesting that the user attached monitor device turn off the location determination circuit.

In various instances of the aforementioned embodiments, the user detached monitor device includes a location determination circuit operable to generate location data indicating a location of the user detached monitor device, and the instructions executable by the processor to determine the location of the user detached monitor device include: instructions executable by the processor to enable the location determination circuit of the user detached monitor device; and instructions executable by the processor to receive the location data indicating the location of the user detached monitor device from the user detached monitor device. In some instances of the aforementioned embodiments, the exclusion zone violation determination circuit includes a computer readable medium including instructions executable by a processor to compare the location data indicating the location of the user attached monitor device with a location of the exclusion zone. In one or more instances of the aforementioned embodiments, the location determination circuit includes a computer readable medium including instructions executable by a processor to: receive location data from external sources, wherein the external sources are selected from a group consisting of: location satellites, Wi-Fi access points, and cellular telephone towers; and determine the location of the user attached monitor device based upon the location data from the external sources.

Other embodiments provide methods for monitoring an individual. The methods include: providing a user attached monitor device, and providing a user detached monitor device. The user attached monitor device includes: an attachment element configured to attach to a limb of an individual being monitored; a location determination circuit operable to generate location data indicating a location of the user attached monitor device; and an exclusion zone violation determination circuit operable to determine whether the individual being monitored is within an exclusion zone. The user detached monitor device includes a computer readable medium including instructions executable by a processor. The instructions are executable by the processor to: determine a location of the user detached monitor device; determine whether the individual being monitored is within the exclusion zone; and transfer control of determining whether the individual is within the exclusion zone from the user attached monitor device to the user detached monitor device.

In some instances, the methods further include securing the user attached monitor device to the limb using the attachment element. In various instances, the methods further include: transferring information between the user detached monitor device and the user attached monitor device using a local communication link; and transferring information between the user detached monitor device and a central monitor using a wide area network.

Other embodiments provide methods for monitoring an individual that include providing a user attached monitor device and a user detached monitor device. The user attached monitor device is secured to a limb of an individual being monitored and includes: a location determination circuit operable to generate location data indicating a location of the user attached monitor device; and an exclusion zone violation determination circuit operable to determine whether the individual being monitored is within an exclusion zone. The user detached monitor device is communicably coupled to the user attached monitor device via a local communication link. The methods further include: disabling the location determination circuit and the exclusion zone violation determination circuit to reduce power usage by the user attached monitor device; using the user detached monitor device to determine a location of the individual being monitored; and using the user detached monitor device to determine whether the individual monitored moved into the exclusion zone.

In some instances of the aforementioned embodiments, the methods further include sending a message indicating a violation of the exclusion zone from the user detached monitor device to a central monitor. In various instances of the aforementioned embodiments, the methods further include: transferring information between the user detached monitor device and the user attached monitor device using a local communication link; and transferring information between the user detached monitor device and a central monitor using a wide area network. In some instances of the aforementioned embodiments, the methods further include downloading a data set indicating the exclusion zone to the user detached monitor device from a central monitor. In one or more instances of the aforementioned embodiments the methods further include communicating at least a portion of the data set from the user detached monitor device to the user attached monitor device via the local communication link. In various instances of the aforementioned embodiments, the methods further include: re-enabling the location determination circuit and the exclusion zone violation determination circuit of the user attached monitor device; using the location determination circuit of the user attached monitor device to determine a location of the individual being monitored; using the exclusion zone violation determination circuit of the user attached monitor device to determine whether the individual monitored moved into the exclusion zone; and sending a message indicating a violation of the exclusion zone from the user attached monitor device to a central monitor.

Turning to FIG. 1a, a block diagram illustrates a hybrid monitoring system 100 including both a user attached monitor device 110 and a user detached monitor device 120 in accordance with various embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a BlueTooth™ communication link. In other examples, local communication link 112 may be a line of sight infrared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wide area wireless (e.g., cellular telephone network, Internet via a Wi-Fi access point, or the like) communication networks 150.

User detached monitor device 120 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145a, 145b, 145c via respective communication links 130, 131, 132. The aforementioned location data is utilized verify the location of a user associated with user detached monitor device 120 at various points as more fully discussed below. User detached monitor device 120 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 120 corresponds to the target.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit— which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 114.

Central monitoring station 160 preferably comprises a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the user in accordance with the described embodiments. In particular, the interactive web portals may enable the monitor to retrieve the location and user identification data of one or more users, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website accessible via a software application on a mobile device (e.g. smart phone). The mobile website may be a modified version of the server supported website with limited or additional capabilities suited for mobile location monitoring.

User attached monitor device 110 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS satellites 145*a*, 145*b*, 145*c* via respective communication links 136, 138, 139. The aforementioned location data is utilized to verify the location of a user associated with user attached monitor device 110 at various points as more fully discussed below. User attached monitor device 110 is considered "non-ambiguous" because it is physically attached to the user in a tamper resistant way and as such provides information only about the user to which it is attached.

The location data and/or other data gathered by user attached monitor device 110 is wirelessly transmitted to central monitoring station 160 via a wide area wireless network 150 accessed via a wireless link 135. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user attached monitor device 110. User attached monitor device may include a strap which can be wrapped around a limb of the individual being monitored to secure user attached monitor device to the individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and US Pat. Pub. No. US 2017-0270778 A1 entitled "Systems and Methods for Improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Figure 1B:
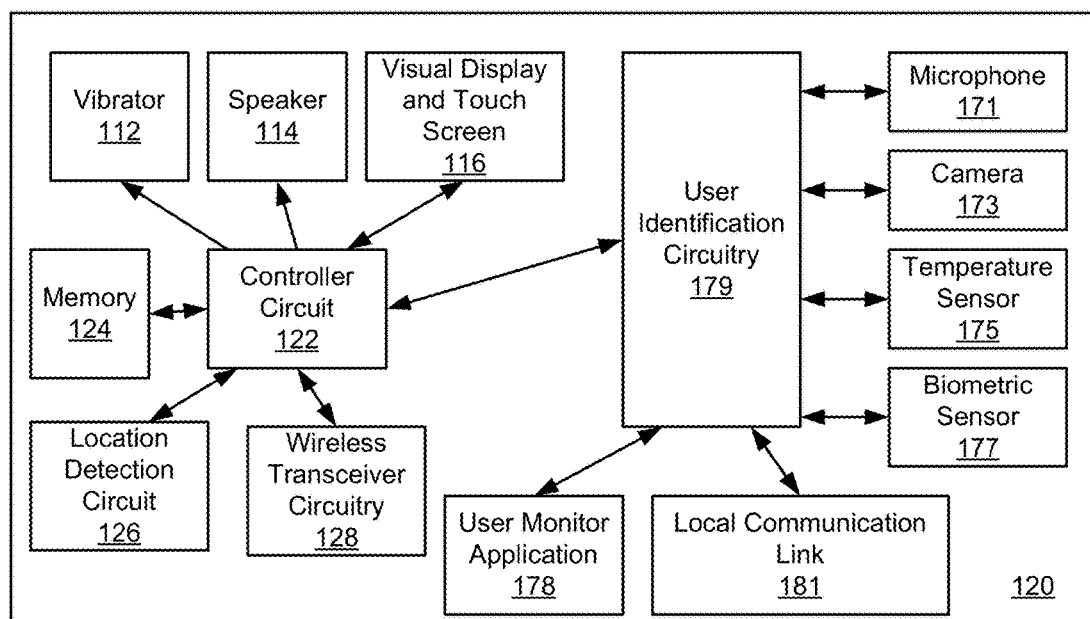
FIG. 1b is a block diagram of a user detached monitor device usable in accordance with one or more embodiments.

Turning to FIG. 1*b*, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication, Internet communication via a Wi-Fi access point, or both. In addition, user detached monitor device 120 includes a vibrator 112, a speaker 114, and a visual display and touch screen 116. In some cases, at scheduled times a user of user detached monitor device 120 is alerted of a need to check-in. The schedule of check-in times may be downloaded to a memory 124 by central monitoring station 160 via wireless link 133. The user may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a control circuit 122 for controlling the operations thereof. In some cases, control circuit 122 includes a processor. In various cases, control circuit 122 is part of an integrated circuit. In one or more cases, memory 124 is included in an integrated circuit with control circuit 122. In various cases, memory 124 may include non-transient instructions (e.g., software of firmware based instructions) executable by controller circuit 122 to perform and/or enable various functions associated with user detached monitor device 120. A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the user involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the user.

User detached monitor device 120 further includes user identification circuitry 179 capable of gathering user identification information from one or more of a microphone 171, a camera 173, a temperature sensor 175, and/or a biometric sensor 177. In some cases, user identification circuitry 179 is incorporated in an integrated circuit with control circuit 122. Microphone 171 is capable of accurately capturing the sound of a user's voice, camera 173 is capable of accurately capturing images including, for example, an image of the user's face, temperature sensor 175 is capable of accurately capturing an ambient temperature around user detached monitor device 120, and biometric sensor 177 is capable of accurately capturing biometric data about the user including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, a camera 173, a temperature sensor 175, and/or a biometric sensor 177 into a user identification package which is forwarded to central monitoring station 160 via wireless transceiver circuitry 128.

User detached monitor device 120 additionally includes location circuitry 126. Location circuitry 126 may include one or more of, a GPS processing circuit capable of fixing a location of user detached monitor device 120 using GPS data, and/or a cell tower triangulation processing circuit capable of fixing a location of user detached monitor device 120 using cell tower triangulation data. A local communication link 181 controls communication between user detached monitor device 120 and user attached monitor device 110. In some embodiments, local communication link 181 supports a BlueTooth™ communication protocol and is capable of both receiving information from user attached monitor device 110 and transmitting information to user attached monitor device 110. In other embodiments, local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments.

Figure 1C:
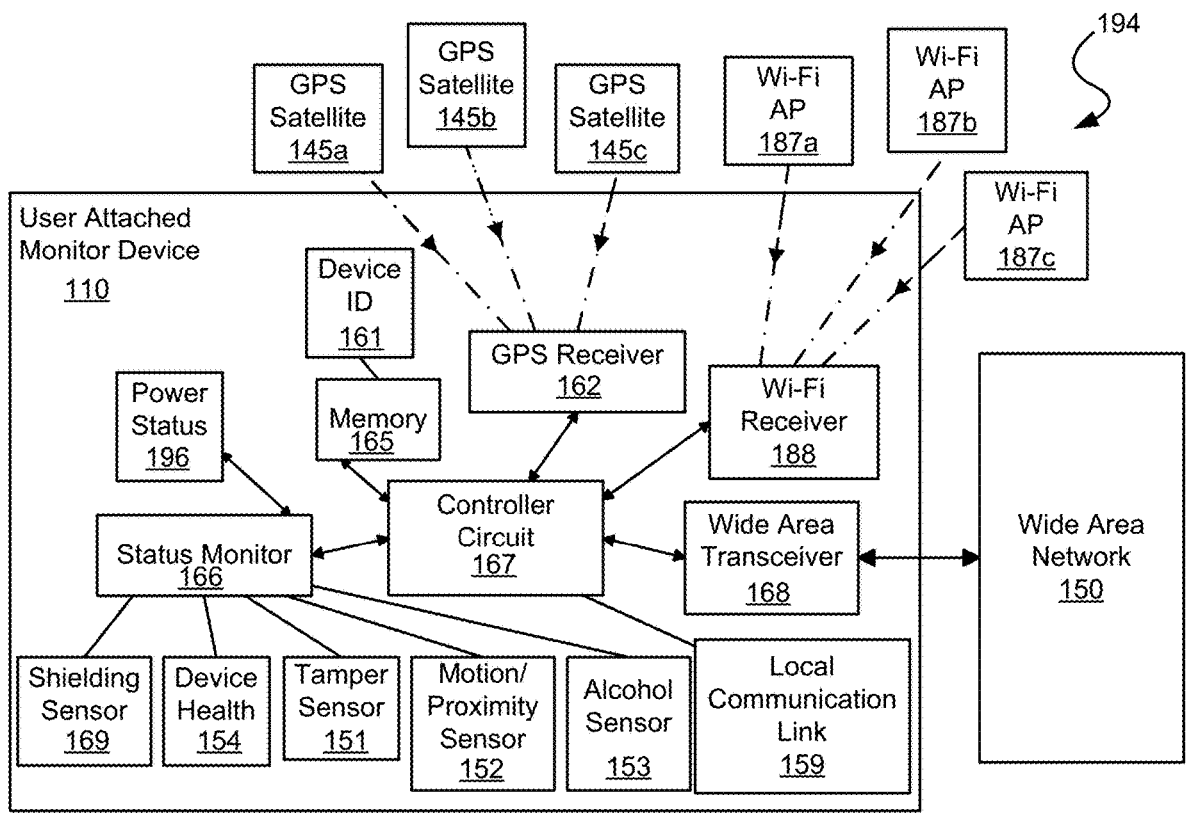
FIG. 1c is a block diagram of a user attached monitor device including a local communication link in accordance with some embodiments.

Turning to FIG. 1c, a block diagram 194 of user attached monitor device 110 including a local communication link 159 in accordance with some embodiments. Local communication link 159 controls communication between user attached monitor device 110 and user detached monitor device 120. In some embodiments, local communication link 159 supports a BlueTooth™ communication protocol and is capable of both receiving information from user detached monitor device 120 and transmitting information to user detached monitor device 120. In other embodiments, local communication link 159 supports a Wi-Fi communication protocol and is capable of both receiving information from user detached monitor device 110 and transmitting information to user detached monitor device 110. In some cases, local communication link 159 supports communication in only a receive or transmit direction. Based upon the disclosure provided herein, one of ordinary skill in the art will recognize a variety of communication protocols and information transfer directions that may be supported by local communication link 159 in accordance with different embodiments.

As shown, user attached monitor device 110 includes a device ID 161 that may be maintained in a memory 165, and thus is accessible by a controller circuit 167. Controller circuit 167 is able to interact with a GPS receiver 162 and memory 165 at times for storing and generating records of successively determined GPS locations. Similarly, controller circuit 167 is able to interact with a Wi-Fi receiver 188 and memory 165 at times for storing and generating records of successively determined Wi-Fi access point identifications and signal strength. In some cases, memory 165 may include non-transient instructions (e.g., software of firmware based instructions) executable by controller circuit 167 to perform and/or enable various functions associated with user attached monitor device 110. As user attached monitor device 110 comes within range of one or more Wi-Fi access points (e.g., Wi-Fi access points 187), Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 167 which stores the information to memory 165.

Where user attached monitor device 110 is operating in a standard mode, controller circuit 167 causes an update and reporting of the location of user attached monitor device 110 via a cellular transceiver 168 and a wide area communication network 150 in accordance with a first time period. In contrast, where user attached monitor device 110 is within range of a public Wi-Fi access point, reporting the location of user attached monitor device 110 may be done via the public Wi-Fi access point in place of the cellular communication link. In another case where user attached monitor device 110 is operating in a low battery mode, reporting the location of user attached monitor device 110 may be done via user detached monitoring device 120 coupled using local communication link 159.

Which technologies are used to update the location of user attached monitor device 110 may be selected either by default, by programming from a central monitor system (not shown), or based upon scenarios. For example, it may be determined whether sufficient battery power as reported by power status 196 remains in user attached monitor device 110 to support a particular position determination technology. Where insufficient power remains, the particular technology is disabled. In some cases, a maximum cost of resolving location may be set for user attached monitor device 110. For example, resolving Wi-Fi location data may incur a per transaction cost to have a third party service provider resolve the location information. When a maximum number of resolution requests have been issued, the Wi-Fi position determination technology may be disabled. Further, it may be determined the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, the Wi-Fi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as cell tower triangulation or GPS may be used.

Controller circuit 167 of user attached monitor device 110 at times functions in conjunction with cellular transceiver 168 to send and receive data and signals through wide area communication network 150. This link at times is useful for passing information and/or control signals between a central monitoring system (not shown) and user attached monitor device 110. The information transmitted may include, but is not limited to, location information, alcohol information, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user detached monitor device 120, and of the individual associated therewith. For example, a status monitor 166 may include one or more of the following subcomponents: power status sensor 196 capable of indicating a power status of user detached monitor device 120. The power status may be expressed, for example as a percentage of battery life remaining. Based upon the disclosure provided herein, one of ordinary skill in the art will recognize a variety of forms in which power status may be expressed. In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 131 capable of determining whether unauthorized access to user attached monitor device 110 has occurred or whether user attached monitor device 110 has been removed from an associated individual being monitored, a motion/proximity sensor 152 capable of determining whether user attached monitor device 110 is moving and/or whether it is within proximity of an individual associated with user detached monitor device 120, and/or an alcohol sensor 153. Such an alcohol sensor may be any alcohol sensor capable of estimating an amount of alcohol in the individual being monitored. Based upon the disclosure provided herein, one of ordinary skill in the art will recognize a variety of alcohol sensors and corresponding alcohol sensing circuitry that may be used in relation to different embodiments. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

Figure 1D:
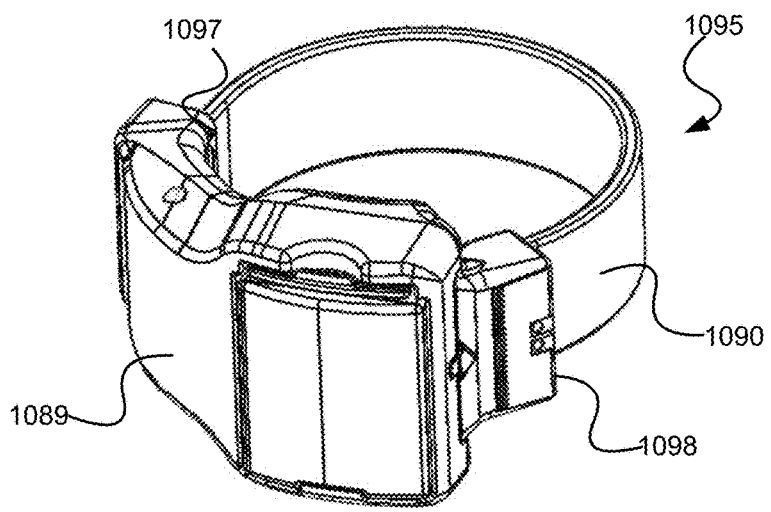
FIG. 1d shows a user attached monitor device with an attachment element for attaching the user attached monitor device to a limb of an individual in accordance with some embodiments.

Turning to FIG. 1d, a user attached monitor device 1089 is shown with an example attachment element 1090 connected at opposite ends of user attached monitor device 1089 (i.e., a first end 1097 and a second end 1098). Attachment element 1090 is operable to securely attach a tracking device 1095 (i.e., a combination of user attached monitor device 1089 and attachment element 1090) to a limb of an individual in accordance with some embodiments. In various embodiments, attachment element 1090 includes electrically and/or optically conductive material used to make a conductive connection form first end 1097 to second end 1098 through attachment element 1090 and is used in relation to determining whether user attached monitor device 1089 remains attached and/or has been tampered with. While FIG. 1d shows a strap as an example attachment element, based upon the disclosure provided herein, one of ordinary skill in the art will recognize other types of attachment elements that may be used in relation to different embodiments.

Figure 2:
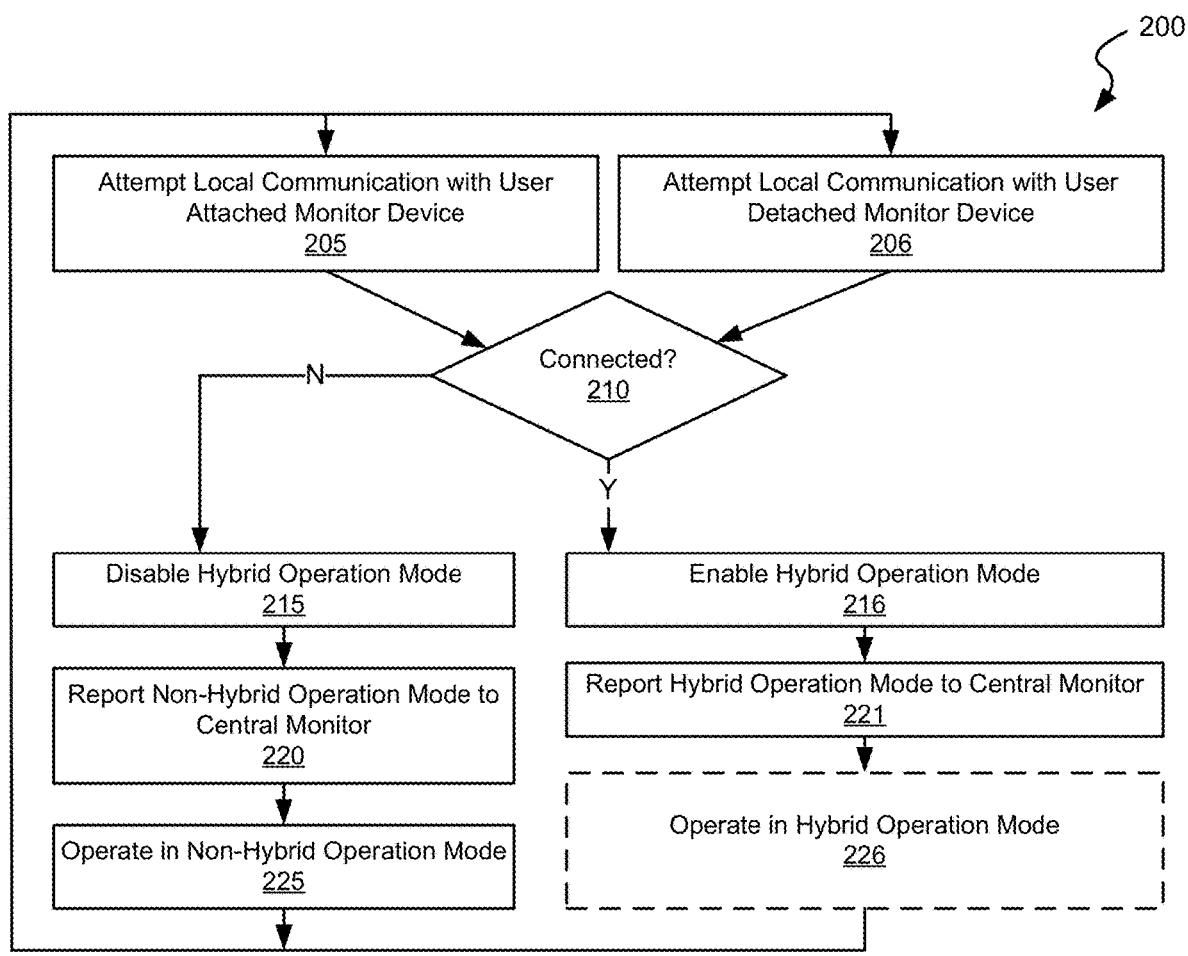
FIG. 2 is a flow diagram showing a method for connecting a user detached monitoring device and a user attached monitoring device using a local communication link, and for changing a mode of operation of a monitoring system based upon the connection in accordance with various embodiments.

Turning to FIG. 2, a flow diagram 200 shows a method for connecting a user detached monitoring device and a user attached monitoring device using a local communication link, and for changing a mode of operation of a monitoring system based upon the connection in accordance with various embodiments. The mode of operation is changed between a non-hybrid operation mode where monitoring is performed exclusively by only one of the user detached monitor device or the user attached monitor device. In certain embodiments, when a connection between a user attached monitor device and a user detached monitor device is not possible, monitoring of an individual is performed exclusively by the user attached monitor device.

Following flow diagram 200, local communication is attempted by the user detached monitor device to the user attached monitor device (block 205). The communication attempt can be sent by one or both of the user attached monitoring device and/or the user detached monitoring device. In some cases, the communication is always attempted by the user detached monitor device to the user attached monitor device (block 205). In such cases, the aforementioned local communication link 181 of the user detached monitor device is used to send a connection request to local communication link 159 of the user attached monitor device. Where the request is accepted by the user attached monitor device, the devices are connected. In some cases, the connection request is a BlueTooth™ communication protocol request. In other cases, the connection request is a Wi-Fi communication protocol request. Based upon the disclosure provided herein, one of ordinary skill in the art will recognize a variety of communication protocol requests that may be used in relation to different embodiments.

In other cases, the communication is always attempted by the user attached monitoring device to the user detached monitor device (block 206). In such cases, the aforementioned local communication link 159 of the user attached monitor device is used to send a connection request to the local communication link 181 of the user detached monitor device. Where the request is accepted by the user detached monitor device, the devices are connected. In certain cases, the communication is attempted by both the user attached monitoring device to the user detached monitor device, and the user detached monitoring device to the user attached monitor device in parallel (block 206). Where either the connection request from the user detached monitor device to the user attached monitor device or the connection request from the user attached monitor device to the user detached monitor device is accepted by the recipient device, the user attached monitor device and the user detached monitor device are considered connected (block 210).

Where the user detached monitor device and the user attached monitor device are considered attached (block 210), hybrid mode operation is enabled (block 216) and the hybrid mode of operation is reported to the central monitor by one or both of the user detached monitor device and/or the user attached monitor device (block 221). Hybrid mode operation allows for use of functionality from a combination of the user attached monitor device and the user detached monitor device (block 226). Such operation in the hybrid mode is shown in dashed lines as there are a large number of combinations of the functionality of the user detached monitor device and the user attached monitor device that may be used in relation to different embodiments. For example, as discussed in more detail below in relation to FIG. 3, where it is determined that the battery in the user attached monitor device is identified the cellular transmitter in the user attached monitor device may be shut down and all cellular communications handled via the user detached monitor device. This may be done, for example, by transferring reporting data from the user attached monitor device to the user detached monitor device (using a combination of local communication link 159 and local communication link 181), and the information transferred to the user detached monitor device is uploaded to a central monitor using the cellular transceiver of the user detached monitor device. Based upon the disclosure provided herein, one of ordinary skill in the art will recognize a variety of combinations of the functionality of the user detached monitor device and the user attached monitor device that may be used in relation to different embodiments.

Alternatively, where the user detached monitor device and the user attached monitor device are not considered attached (block 210), the hybrid mode of operation is disabled (block 215) and the non-hybrid mode of operation is reported to the central monitor by one or the other of the user detached monitor device or the user attached monitor device that attempted to connect to the other but failed to establish a connection (block 220). Non-hybrid mode operation causes both the user attached monitor device and the user detached monitor device to operate as if they are the only monitoring device in operation (block 225).

Figure 3:
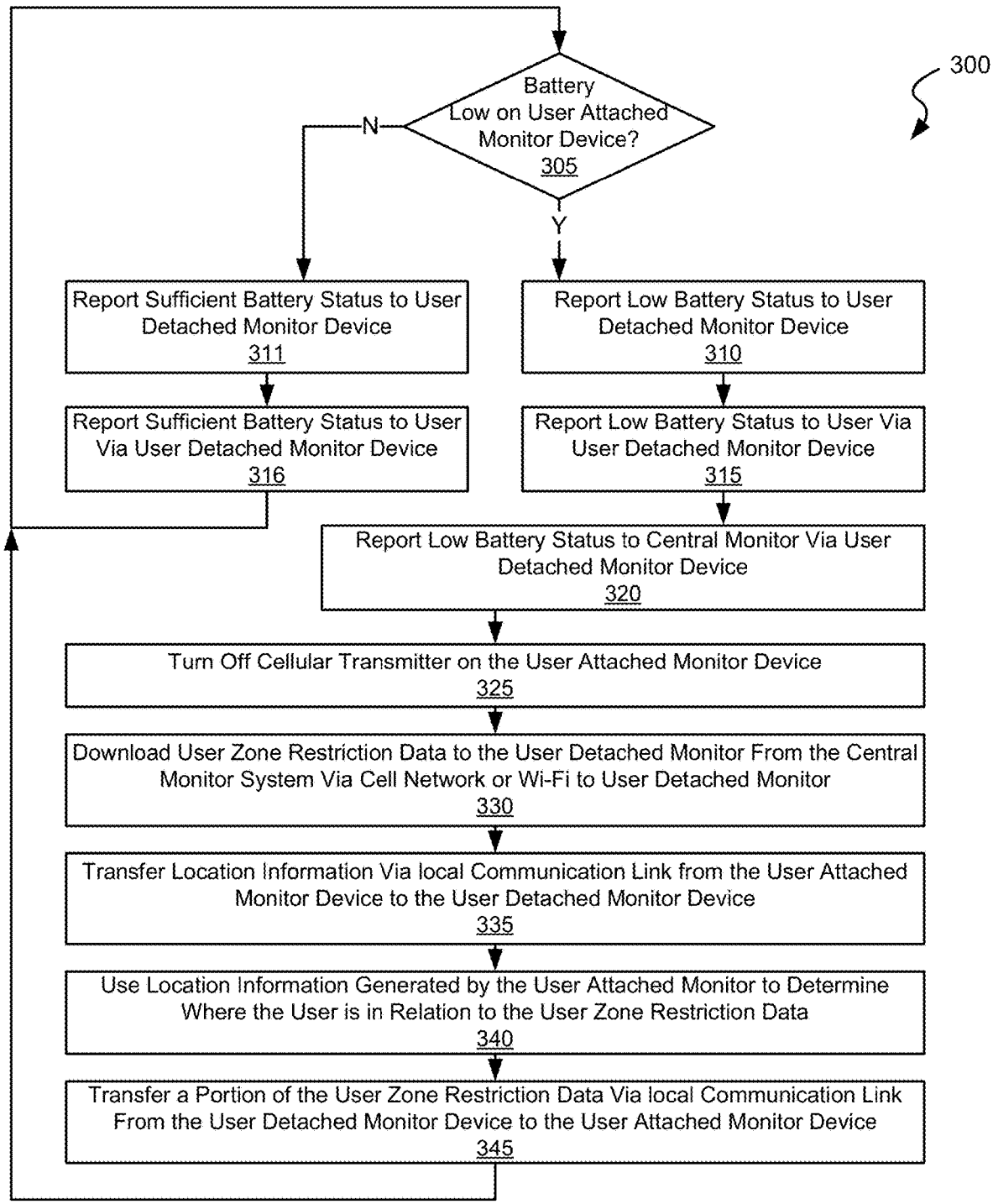
FIG. 3 is a flow diagram showing a method for using a user detached monitoring device to perform exclusion zone monitoring in place of a user attached monitor device in accordance with one or more embodiments.

Turning to FIG. 3, a flow diagram 300 shows a method for operating in a hybrid mode of operation (one example of processes performed in block 226 discussed above) that includes using a user detached monitoring device to report battery status of a user attached monitoring device and to change a mode of operation of a monitoring system in accordance with one or more embodiments. Following flow diagram 300, a status monitor on the user attached monitor device determines whether a low battery condition exists (block 305). A low battery condition may be, for example, a condition where less than twenty percent of a full charge remains on the battery of the user attached monitor device. Based upon the disclosure provided herein, one of ordinary skill in the art will recognize a variety of conditions that may be considered a low battery condition for different embodiments.

Where a low battery condition is determined by the user attached monitor device (block 305), the low battery condition is reported by the user attached monitor device to the user detached monitor device (block 310). This information is communicated via a message sent via the local communication link 159 of the user attached monitor device to the local communication link 181 of the user detached monitor device. The message is sent using any protocol supported between the local communication link 159 and the local communication link 181. In some embodiments, the message includes only a header indicating the message type (i.e., low battery) that implies the low battery condition. In other embodiments, the message includes a header indicating the message type (i.e., low battery) followed by detailed battery information in a data packet following the header. Based upon the disclosure provided herein, one of ordinary skill in the art will recognize a variety of messages and/or message protocols that may be used in relation to different embodiments to indicate low battery status from the user attached monitor device to the user detached monitor device.

The user detached monitor device reports the low battery status to the individual being monitored (i.e., the individual associated with the user detached monitor device) (block 315). This reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device reports the low battery status to a central monitor (block 320). In some embodiments, reporting of the low battery status to the central monitor is done via a cellular telephone network via the wireless transceiver circuitry 128 of the user detached monitor device. Alternatively, reporting of the low battery status to the central monitor is done via the Internet using a Wi-Fi hotspot via the wireless transceiver circuitry 128 of the user detached monitor device.

The user attached monitor device disables the cellular transmission capability (e.g., the cellular transceiver 168) (block 325). By transmitting the low battery condition to the central monitor via the user detached monitor device and turning off the cellular communication capability of the user detached monitor device, the battery of the user attached monitor device is preserved.

In addition, user zone restriction data is downloaded from a central monitor to the user detached monitor device in preparation to perform exclusion zone monitoring (block 330). This download may be performed using any communication path between the user detached monitor device and the central monitor. For example, the download may be done via a cellular network or over the internet via a Wi-Fi connection.

Such user zone restriction data identifies one or more areas where the user associated with the user attached monitor device and/or the user detached monitor device are either precluded or discouraged from entering. These precluded or discouraged areas are referred to herein as exclusion zones. As used herein, an "exclusion zone" is any area or location where an individual associated with the user detached monitor device and/or the user attached monitor device is prohibited and/or discouraged from entering. The exclusion zones may be identified in a number of ways. For example, the exclusion zones may be identified as two opposing corners of a rectangle or a center point and radius of a circle. Based upon the disclosure provided herein, one of ordinary skill in the recognize other approaches that may be used for identifying the boundaries of an exclusion zone. The universe of exclusion zones may be developed, for example, by local area officials to identify the location of different types of zones in a region that they operate. In turn, zone information from a number of local regions may be assembled in a common database to make a wider area map of zones. Exclusion zones may each be identified for different reasons, and may be grouped together with other exclusion zones that share similar characteristics. For example, places where children are present like parks and schools, places where alcohol is prevalent such as bars or night clubs, or the like. Individuals may be precluded from entering one or more types of exclusion zones.

Location information gathered by location determination circuitry of the user attached monitor device is transmitted to the user detached monitor device via the local communication link (block 335). This location information may be that gathered using GPS or any of the other supported methods for determining location, and is provided to the user detached monitor device as a physical location of the user being monitored. This location information generated by the user attached monitor device is used by the user detached monitor device to determine where the user is relative to any exclusion zones previously downloaded as part of the user zone restriction data (block 340).

Where any part of the user zone restriction data is new to the user and has not previously been updated to the user attached monitor device, the user detached monitor device transfers at least that portion of the user restriction data to the user attached monitor device via the local communication link (block 345). By transferring any new user zone restriction data to the user attached monitor device, the user attached monitor device does not need to be updated when it is brought back online as the device primarily responsible for monitoring exclusion zone violations.

Alternatively, where a low battery condition is not reported by the user attached monitor device to the user detached monitor device (block 305), the user detached monitor device periodically reports sufficient battery to the individual being monitored (i.e., the individual associated with the user detached monitor device) (block 311). Similar to that described above, this reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device periodically reports sufficient battery to the individual being monitored (i.e., the individual associated with the user detached monitor device) via the user detached monitor device (block 316). Similar to that described above, this reporting may be done, for example, by displaying a message indicating the sufficient battery condition via the visual display and touch screen 116 of the user detached monitor device. As another example, the message indicating the sufficient battery condition may be delivered as an audio alert via the speaker 114 of the user detached monitor device. Based upon the disclosure provided herein, one of ordinary skill in the art will recognize a variety of methods and/or mechanisms for alerting an individual being monitored of a sufficient battery condition of the user attached monitor device.

Figure 4:
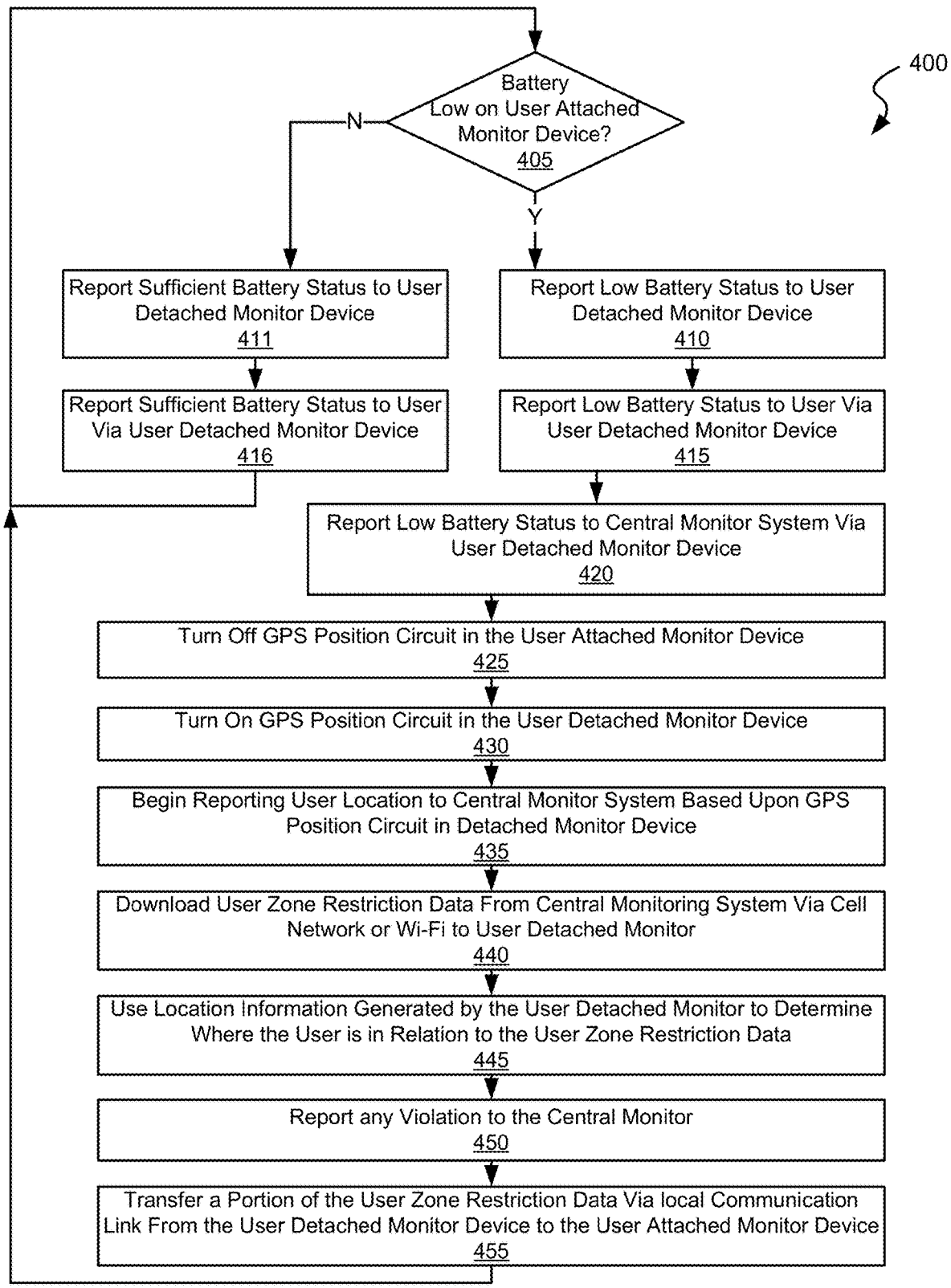
FIG. 4 is a flow diagram showing another method for using a user detached monitoring device to perform exclusion zone monitoring in place of a user attached monitor device in accordance with various embodiments.

Turning to FIG. 4, a flow diagram 400 shows a method for operating in a hybrid mode of operation (another example of processes performed in block 226 discussed above) that includes using location coordinates from the user detached monitor device in place of user coordinates from the user attached monitor device in accordance with various embodiments. Following flow diagram 400, a status monitor on the user attached monitor device determines whether a low battery condition exists (block 405). A low battery condition may be, for example, a condition where less than twenty percent of a full charge remains on the battery of the user attached monitor device. Based upon the disclosure provided herein, one of ordinary skill in the art will recognize a variety of conditions that may be considered a low battery condition for different embodiments.

Where a low battery condition is determined by the user attached monitor device (block 405), the low battery condition is reported by the user attached monitor device to the user detached monitor device (block 410). This information is communicated via a message sent via the local communication link 159 of the user attached monitor device to the local communication link 181 of the user detached monitor device. The message is sent using any protocol supported between the local communication link 159 and the local communication link 181. In some embodiments, the message includes only a header indicating the message type (i.e., low battery) that implies the low battery condition. In other embodiments, the message includes a header indicating the message type (i.e., low battery) followed by detailed battery information in a data packet following the header. Based upon the disclosure provided herein, one of ordinary skill in the art will recognize a variety of messages and/or message protocols that may be used in relation to different embodiments to indicate low battery status from the user attached monitor device to the user detached monitor device.

The user detached monitor device reports the low battery status to the individual being monitored (i.e., the individual associated with the user detached monitor device) (block 415). This reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device reports the low battery status to a central monitor (block 420). In some embodiments, reporting of the low battery status to the central monitor is done via a cellular telephone network via the wireless transceiver circuitry 128 of the user detached monitor device. Alternatively, reporting of the low battery status to the central monitor is done via the Internet using a Wi-Fi hotspot via the wireless transceiver circuitry 128 of the user detached monitor device.

The attached monitor device disables GPS location determination functionality (e.g., the GPS receiver 162) (block 425). In some cases, any Wi-Fi based location functionality is also disabled. By turning off the GPS location determination functionality and/or other location determination functionality in the user attached monitor device, the battery of the user attached monitor device is preserved.

The user detached monitor device turns on GPS location functionality in the user detached monitor device (e.g., the location detection circuit 126) (block 430). In some cases, any Wi-Fi based location functionality is also turned on—either in addition to GPS location functionality or in place of GPS location functionality. By turning off the location determination functionality of the user attached monitor device and turning on the location determination functionality of the user detached monitor device, power is effectively being shared from the user detached monitor device to the user attached monitor device.

Location status expected by the central monitor is serviced by the user detached monitor device instead of the user attached monitor device (block 435). While such location information from the user detached monitor device may be considered less reliable than that from the user attached monitor device because the user detached monitor device is not physically attached to the individual being monitored, a periodic connection request from the user detached monitor device to the user attached monitor device can be used to verify that the user detached monitor device is within a define range (i.e., a range supported between the local communication link 181 of the user detached monitor device and the local communication link 159 of the user attached monitor device. By knowing that the user detached monitor device is within a communication range of the user attached monitor device, the reliability of location information derived from the user detached monitor device can be made more reliable.

In addition, user zone restriction data is downloaded from a central monitor to the user detached monitor device in preparation to perform exclusion zone monitoring (block 440). This download may be performed using any communication path between the user detached monitor device and the central monitor. For example, the download may be done via a cellular network or over the internet via a Wi-Fi connection. Again, an exclusion zone is any area or location where an individual associated with the user detached monitor device and/or the user attached monitor device is prohibited and/or discouraged from entering.

User location information generated by the GPS location capability of the user detached monitor device is used by the detached monitor device to determine whether the user has violated any of the exclusion zones (block 445). Where the location of the user is determined to be within an area defined as an exclusion zone by the user zone restriction data, a violation of the exclusion zone is said to have occurred. Any violations are reported by the user detached monitor device to the central monitor using either a cellular telephone network or the internet via a Wi-Fi connection.

Where any part of the user zone restriction data is new to the user and has not previously been updated to the user attached monitor device, the user detached monitor device transfers at least that portion of the user restriction data to the user attached monitor device via the local communication link (block 455). By transferring any new user zone restriction data to the user attached monitor device, the user attached monitor device does not need to be updated when it is brought back online as the device primarily responsible for monitoring exclusion zone violations.

Alternatively, where a low battery condition is not reported by the user attached monitor device to the user detached monitor device (block 405), the user detached monitor device periodically reports sufficient battery to the individual being monitored (i.e., the individual associated with the user detached monitor device) (block 411). Similar to that described above, this reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device periodically reports sufficient battery to the individual being monitored (i.e., the individual associated with the user detached monitor device) via the user detached monitor device (block 416). Similar to that described above, this reporting may be done, for example, by displaying a message indicating the sufficient battery condition via the visual display and touch screen 116 of the user detached monitor device. As another example, the message indicating the sufficient battery condition may be delivered as an audio alert via the speaker 114 of the user detached monitor device. Based upon the disclosure provided herein, one of ordinary skill in the art will recognize a variety of methods and/or mechanisms for alerting an individual being monitored of a sufficient battery condition of the user attached monitor device.

Figure 5:
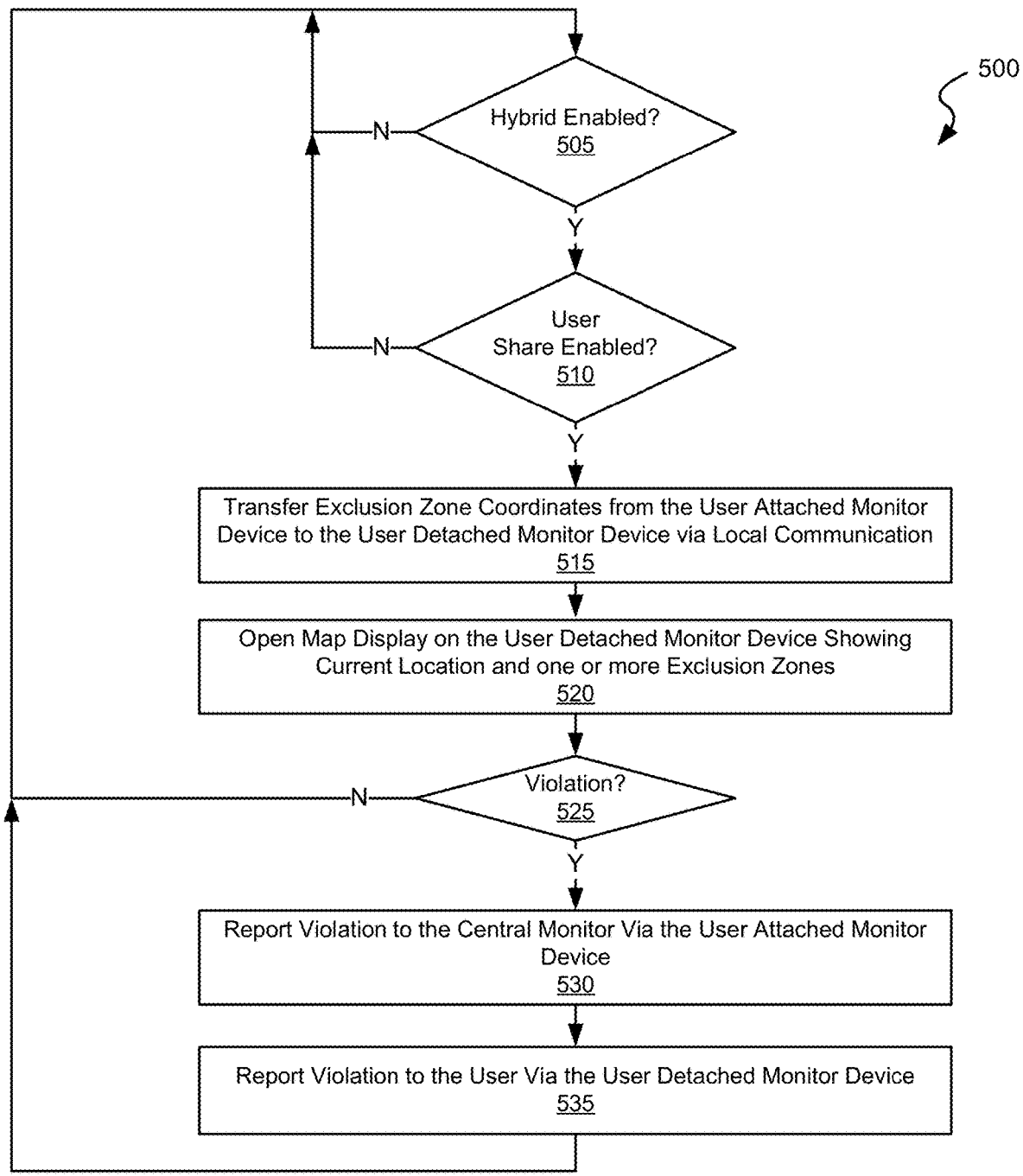
FIG. 5 is a flow diagram showing a method for using a display on a user detached monitoring device to report on exclusion zone monitoring being performed by a user attached monitor device in accordance with some embodiments.

Turning to FIG. 5, a flow diagram 500 shows a method for using a display on a user detached monitoring device to report on exclusion zone monitoring being performed by a user attached monitor device in accordance with some embodiments. Following flow diagram 500, it is determined whether a hybrid enabled system exists (block 505). A hybrid enabled system is determined using the process described above in relation to FIG. 2 where it is determined if local communication can be established between a user attached monitor device and a user detached monitor device. Where it is determined that a hybrid enabled system exists (block 505), it is determined whether a user share is enabled (block 510). A user share may be, for example, a data field in one or both of the user attached monitor device and/or the user detached monitor device that is used to indicate that it is allowable to share information with the user. This user share may be programmed by an monitoring individual attaching the user attached monitor device to the user being monitored. Sharing data with the user is done as a process to graduate a user from intense monitoring by showing the user the information being monitored in an effort to get the user to take control of monitoring their own behavior.

Where a user share is enabled to allow sharing of monitored data with the user (block 510), exclusion zone coordinates are transferred from the user attached monitor device to the user detached monitor device via a local communication link (block 515). As discussed above, exclusion zones are any area or location where an individual associated with the user detached monitor device and/or the user attached monitor device is prohibited and/or discouraged from entering. The exclusion zones may be identified in a number of ways. For example, the exclusion zones may be identified as two opposing corners of a rectangle or a center point and radius of a circle. Based upon the disclosure provided herein, one of ordinary skill in the recognize other approaches that may be used for identifying the boundaries of an exclusion zone. The universe of exclusion zones may be developed, for example, by local area officials to identify the location of different types of zones in a region that they operate. In turn, zone information from a number of local regions may be assembled in a common database to make a wider area map of zones. Exclusion zones may each be identified for different reasons, and may be grouped together with other exclusion zones that share similar characteristics. For example, places where children are present like parks and schools, places where alcohol is prevalent such as bars or night clubs, or the like. Individuals may be precluded from entering one or more types of exclusion zones.

A map is then opened on the display of the user detached monitor device (block 520). The map includes an indication of the user's current location along with outlines of one or more exclusion zones that may be near (i.e., within the image of the display) the user's current location. The user is thus provided a graphical display of where they are in relation to various exclusion zones at all times, and thus begin the process of self monitoring their movements.

It is determined by the user attached monitor device whether the user has ventured into an exclusion zone (block 525). Such movement into an exclusion zone is considered a violation and is reported by the user attached monitor device to a central monitor (block 530). In addition, the violation is reported to the user by, for example, displaying a violation message via a display on the user detached monitor device (block 535).

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
    a user attached monitor device, wherein the user attached monitor device includes:
        an attachment element configured to attach to a limb of an individual being monitored;
        a communication circuit operable to at least receive communications from a portable user detached monitor device; and
        a first location determination circuit operable to determine a location of the user attached monitor device;
    the portable user detached monitor device including:
    a second location determination circuit;
    a processor; and
    a computer readable medium including instructions executable by the processor to:
        transfer a request to disable the first location determination circuit to the user attached monitor device via the communication circuit;
        determine a location of the user detached monitor device based upon data from the second location determination circuit; and
        communicate the location of the user detached monitor device to a central monitor system.

2. The monitoring system of claim 1, wherein the user attached monitor device further includes:
    an exclusion zone violation determination circuit operable to determine whether the individual being monitored is within an exclusion zone; and
    wherein the instructions executable by the processor are further executable to transfer a request to disable the exclusion zone violation determination circuit to the user attached monitor device via the communication circuit.

3. The monitoring system of claim 1, wherein the first location determination circuit includes a computer readable medium including instructions executable by a processor to:
    receive location data from external sources, wherein the external sources are selected from a group consisting of: location satellites, Wi-Fi access points, and cellular telephone towers; and
    determine the location of the user attached monitor device based upon the location data from the external sources.

4. The monitoring system of claim 2, wherein the exclusion zone violation determination circuit includes a computer readable medium including instructions executable by a processor to compare the location data indicating the location of the user attached monitor device with a location of an area indicated in a user zone restriction data.

5. The monitoring system of claim 1, wherein the instructions executable by the processor are further executable to:
    receive user zone restriction data; and
    determine whether the location of the user detached monitor device is within an area precluded by the user zone restriction data.

6. The monitoring system of claim 5, wherein the user zone restriction data is received from the central monitor system.

7. The monitoring system of claim 6, wherein the user zone restriction data is received by the user detached monitor device from the central monitor via a communication link selected from a group consisting of: a cellular telephone network, and a Wi-Fi communication link.

8. The monitoring system of claim 5, wherein the instructions executable by the processor to determine whether the location of the user detached monitor device is within an area precluded by the user zone restriction data include:
    instructions executable by the processor to compare the location data indicating the location of the user detached monitor device against the user zone restriction data to determine whether the individual being monitored is within an area precluded by the user zone restriction data.

9. The monitoring system of claim 1, wherein the instructions executable by a processor to determine the location of the user detached monitor do not rely on data from the first location determination circuit of the user attached monitor device.

10. A monitoring system, the monitoring system comprising:
    a user attached monitor device, wherein the user attached monitor device includes:
        an attachment element configured to attach to a limb of an individual being monitored;
        a location determination circuit;
        a communication circuit operable to at least receive communications from a portable user detached monitor device;
        an exclusion zone violation determination circuit operable to determine whether the individual being monitored is within an exclusion zone;
    the portable user detached monitor device, wherein the user detached monitor device includes:

a computer readable medium including instructions executable by a processor to:
  communicate a request to disable the location determination circuit to the user attached monitor device via the communication circuit;
  determine a location of the user detached monitor device; and
  transfer an indication of the location of the user detached monitor device to the user attached monitor device via the communication circuit.

11. The monitoring system of claim 10, wherein the location determination circuit is a first location determination circuit; and wherein the user detached monitor device further includes:
  a second location determination circuit, and wherein the instructions executable by the processor to determine the location of the user detached monitor device utilize information from the second location determination circuit.

12. The monitoring system of claim 11, wherein the instructions executable by the processor are further executable by the processor to enable the second location determination circuit.

13. The monitoring system of claim 11, wherein the location data received by the user detached monitor device from the user attached monitor device is received via a local location communication link.

14. A method for monitoring an individual, the method comprising:
  providing a user attached monitor device, wherein the user attached monitor device includes:
    an attachment element configured to attach to a limb of an individual being monitored;
    a communication circuit operable to at least receive communications from a portable user detached monitor device; and
    a first location determination circuit operable to determine a location of the user attached monitor device;
  providing the portable user detached monitor device including a second location determination circuit;
  transferring a request to disable the first location determination circuit to the user attached monitor device via the communication circuit;
  determining a location of the user detached monitor device based upon data from the second location determination circuit; and
  communicating the location of the user detached monitor device to a central monitor system.

15. The method of claim 14, wherein the user attached monitor device further includes:
  an exclusion zone violation determination circuit operable to determine whether the individual being monitored is within an exclusion zone; and
  wherein the method further includes transferring a request to disable the exclusion zone violation determination circuit to the user attached monitor device via the communication circuit.

16. The method of claim 14, wherein the first location determination circuit includes a computer readable medium including instructions executable by a processor to:
  receive location data from external sources, wherein the external sources are selected from a group consisting of: location satellites, Wi-Fi access points, and cellular telephone towers; and
  determine the location of the user attached monitor device based upon the location data from the external sources.

17. The method of claim 15, wherein the exclusion zone violation determination circuit includes a computer readable medium including instructions executable by a processor to compare the location data indicating the location of the user attached monitor device with a location of an area indicated in a user zone restriction data.

18. The method of claim 14, wherein the instructions executable by the processor are further executable to:
  receive user zone restriction data; and
  determine whether the location of the user detached monitor device is within an area precluded by the user zone restriction data.

19. The method of claim 18, wherein the user zone restriction data is received from the central monitor system.

20. The method of claim 19, wherein the user zone restriction data is received by the user detached monitor device from the central monitor via a communication link selected from a group consisting of: a cellular telephone network, and a Wi-Fi communication link.

* * * * *